United States Patent [19]

Imazeki et al.

[11] 4,356,552
[45] Oct. 26, 1982

[54] TRACER CONTROL EQUIPMENT

[75] Inventors: Ryoji Imazeki; Etsuo Yamazaki, both of Hachioji, Japan

[73] Assignee: Fujitsu Fanuc Limited, Tokyo, Japan

[21] Appl. No.: 131,670

[22] Filed: Mar. 19, 1980

[51] Int. Cl.³ ...................... G06F 15/46; G05B 19/37
[52] U.S. Cl. .................................. 364/474; 318/571; 318/578; 364/171; 364/520
[58] Field of Search ............... 364/474, 520, 475, 120, 364/107, 167–171, 188–190; 318/571, 578; 409/67, 79, 80; 219/124.34

[56] References Cited

U.S. PATENT DOCUMENTS

| | | | |
|---|---|---|---|
| 3,559,021 | 1/1971 | Bingham, Jr. | 318/568 |
| 3,609,322 | 9/1971 | Burnett et al. | 318/578 X |
| 3,624,343 | 11/1971 | Stjernstrom et al. | 318/578 X |
| 3,707,662 | 12/1972 | Hoffmann | 318/578 |
| 3,875,382 | 4/1975 | Cutler | 318/571 X |
| 3,916,571 | 11/1975 | Seidel | 318/578 X |
| 3,975,667 | 8/1976 | Bory | 318/571 X |
| 3,976,928 | 8/1976 | Wenzel | 318/578 |
| 4,064,445 | 12/1977 | Wenzel | 318/578 |
| 4,064,446 | 12/1977 | Krohn | 318/578 |
| 4,084,244 | 4/1978 | Floter | 364/474 |
| 4,157,679 | 6/1979 | Wenzel | 318/578 X |
| 4,164,694 | 8/1979 | Amsbury | 318/578 |
| 4,166,941 | 9/1979 | Cecil | 318/578 X |
| 4,224,670 | 9/1980 | Yamazaki | 364/474 |
| 4,258,425 | 3/1981 | Ramsey et al. | 219/124.34 X |

Primary Examiner—Joseph F. Ruggiero
Attorney, Agent, or Firm—Staas & Halsey

[57] ABSTRACT

In a tracer control system, parameters necessary for a trace operation, such as, for example, tracer head reference displacement value, trace axis, trace direction, pick feed value, and various limits, are set in combination for each trace mode. A character display is provided for displaying various parameters, so that it is easy to confirm each of the required parameters corresponding to a selected trace mode, and check whether the setting of all required parameters has been completed or not and whether the value of each set parameter is the desired one or not.

16 Claims, 22 Drawing Figures

FIG. 4

| MANUAL TRACE | |
|---|---|
| 01 DEFLECTION | : 0.200MM |
| | |
| 01=0.200 | |

IN PUT  IN PUT

FIG. 5

| BOTH WAYS SCAN TRACE | | (2) |
|---|---|---|
| 01 DEFLECTION | : 0.200MM  - | |
| 02 TRACE DIRECTION | : +X | |
| 03 TRACE VELOCITY | : 1500MM/MIN | |
| 04 PICK VALUE | : -30.5MM | |
| 05 PICK METHOD | : AXIS | |
| 06 PICK VELOCITY | : 300MM/MIN | |
| 07 PENCIL | : OFF | |
| 08 45 DEG. | : OFF | |
| 09 CUTTING MODE | : FINE | |
| 10 AUTO RETURN | : OFF | |
| 11 DIAGONAL | : OFF | |
| | | |
| 03=1500 | | (2) |

IN PUT  IN PUT

| ONE WAY SCAN TRACE | |
|---|---|
| 01 DEFLECTION | : 0.200MM |
| 02 TRACE DIRECTION | : +X |
| 03 TRACE VELOCITY | : 1500MM/MIN |
| 04 PICK VALUE | : -30.5MM |
| 05 PICK METHOD | : AXIS |
| 06 PICK VELOCITY | : 300MM/MIN |
| 07 PENCIL | : OFF |
| 08 45 DEG | : OFF |
| 09 CUTTING MODE | : FINE |
| 10 AUTO RETURN | : ON |
| 11 UPWARD TRACING | : OFF |
| 12 SLOW APPROACH | : Z |

|    | 360 DEG. CONTOUR TRACE |              |
|----|------------------------|--------------|
| 01 | DEFLECTION             | 0.200MM      |
| 02 | TRACE DIRECTION        | LEFT         |
| 03 | TRACE VELOCITY         | 1500MM/MIN   |
| 04 | PICK VALUE             | +30.5MM      |
| 05 | PICK METHOD            | AXIS         |
| 06 | PICK VELOCITY          | 300MM/MIN    |
| 07 | Z AXIS PICK            | OFF          |
| 08 | PENCIL                 | OFF          |
| 09 | CUTTING MODE           | FINE         |
| 10 | AUTO RETURN            | ON           |

FIG. 9

|    | PARTIAL CONTOUR TRACE |              |
|----|-----------------------|--------------|
| 01 | DEFLECTION            | 0.200MM      |
| 02 | TRACE DIRECTION       | RIGHT        |
| 03 | TRACE VELOCITY        | 1500MM/MIN   |
| 04 | PICK VALUE            | +30.5MM      |
| 05 | PICK METHOD           | AXIS         |
| 06 | PICK VELOCITY         | 300MM/MIN    |
| 07 | PENCIL                | OFF          |
| 08 | CUTTING MODE          | FINE         |
| 09 | AUTO RETURN           | ON           |

FIG. 10

```
┌─────────────────────────────────────────┐
│     3-DIMENSIONAL TRACE                 │
│ 01  DEFLECTION         :  0.500MM       │
│ 02  TRACE DIRECTION    :  LEFT          │
│ 03  TRACE VELOCITY     :  500MM/MIN     │
│ 04  Z-DEFLECTION       :  0.100MM       │
│ 05  PENCIL             :  OFF           │
│ 06  AUTO RETURN        :  ON            │
│                                         │
└─────────────────────────────────────────┘
```

FIG. 11

```
MANUAL TRACE (LYP=03)
               +1234                  (LRP=09)
                  |                    +1234
                  |                   (LCZ=07)
                  |,-III               +5678
 (LXN=02) -------+------- (LXP=01)
  -1234           |        +5678
                  |
                  |
              (LYN=04)
               -5678

01=+5678/OFF
```

FIG. 12

```
 BOTH WAYS SCAN TRACE                           (2)
                    WL=10:ON
         (LYP=03)
          +1234                      (LRP=09)    (2)
                                      +1234

(LZP=05)
                                      +5678
(LXN=02)-----+-----(LXP=01)
  -1234            +5678             (LCZ=07)    (2)
                                      +9012
         (LYN=04)
          -5678                      (LZN=06)
                                      -3456
```

FIG. 13

```
 BOTH WAYS SCAN TRACE                           (2)

X     WLPY         X     WLNY
  01 +1234  +5678      +1234  -5678             (2)
  02 +2345  +6789      +2345  -6789             (2)
```

FIG. 14

```
ONE WAY SCAN TRACE                                    (2)

(LYP=03)
             +1223
                                          (LRP=09)
                                           +1234
                                             :
                                          (LZP=05)
(LXN=02)----+----(LXP=01)                  +5678
  -1234          +5678                    (LRA=08)
                                           +9012
            (LYN=04)                         :
             -5678                        (LCZ=07)
                                           +3456
```

FIG. 15

```
360 DEG. CONTOUR TRACE                                (2)
                       WL=10:OFF
            (LYP=03)
             +1234
                                          (LRP=09)
                                           +1234
                                             :
                                          (LZP=05)
         ----+----(LXP=01)                 +5678
                  +5678                      :
                                          (LZN=06)
                                           -9012
```

FIG. 16

```
PARTIAL CONTOUR TRACE                    (2)
                        WL=10:OFF
          (LYP=03)                (LRP=09)
           +1234                   +1234

(LZP=05)
                                   +5678

(LXN=02)-----+-----(LXP=01)
 -1234       |      +5678         (LZN=06)
             |                     -9012

(LYN=04)
           -5678
```

FIG. 17

```
3-DIMENSIONAL TRACE                      (2)

(LYP=03)
           +1234                  (LRP=09)
             |                     +1234
             |
      -------+-----(LXP=01)
             |      +5678
             |
```

FIG. 18

| MAIN PROGRAM 01 | | |
|---|---|---|
| 01 | G00X1234.56 | |
| 02 | G01Y2345.67F1000 | |
| 03 | G10P2 | |
| 04 | DEFLECTION : MM | (Note 1) |
| 05 | LCZ : 99 1234 | (Note 2) |
| 06 | F : MM/MIN | |
| 07 | CUTTING MODE : | |
| 08 | APPROACH : -Z | (Note 3) |
| 09 | G10P2 | |
| 10 | DEFLECTION : 0.600MM | |
| 11 | LCZ : | |
| 12 | F : 1000MM/MIN | |

FIG. 19

| MAIN PROGRAM 02 |
|---|
| 13    CUTTING MODE : FINE |
| 14    APPROACH : -Z |
| 15 G00Y1234.56 |
| 16 G01Z2345.67 |
| 17 G11X+1234.56Y+2345.67P100.00 |
| 18 F200 |
| 19 M02 |

```
E  :  9.999
ED : -9.999
EZ : -9.999
EG : -9.999
```

TRACER CONTROL EQUIPMENT

BACKGROUND OF THE INVENTION

1. Field of the Invention

This invention relates to tracer control equipment, and more particularly to a tracer control system having incorporated therein a processor.

2. Description of the Prior Art

A tracer control system is usually operable in a selected one of several tracing modes, but requires parameters necessary for the tracing operation, such as, for example, tracer reference displacement, tracing axis, direction of tracing, pick feed value, various limits, and so forth. These parameters to be set differ in combination for each mode of tracing operation.

Accordingly, it is necessary for an operator to set the parameters while selecting them in accordance with the tracing mode adopted, and to check whether all parameters have been set.

Usually these parameters are set by means of dials, switches or the like, and in the case of a tracer control system using a processor, they are entered manually, e.g. as from a keyboard. But it is very cumbersome to check each of the required parameters corresponding to the tracing mode selected, and it is impossible to check whether setting of all required parameters has been completed or not; accordingly, cases are often met with in which some of the required parameters have been left unset.

SUMMARY OF THE INVENTION

It is an object of the present invention to provide a tracer control system which permits easy and accurate setting of parameters, and allows ease in checking the values of the parameters being set and in checking the presence of the parameters required for individual tracing modes.

The above object can be achieved by providing a tracer control system with a character display for displaying various parameters defining a tracing operation.

BRIEF DESCRIPTION OF THE DRAWING

FIGS. 4 to 21 are explanatory of examples of displays on the character display; and FIG. 22 is explanatory of a both way scan tracing operation.

DESCRIPTION OF THE PREFERRED EMBODIMENTS

Figure 1:
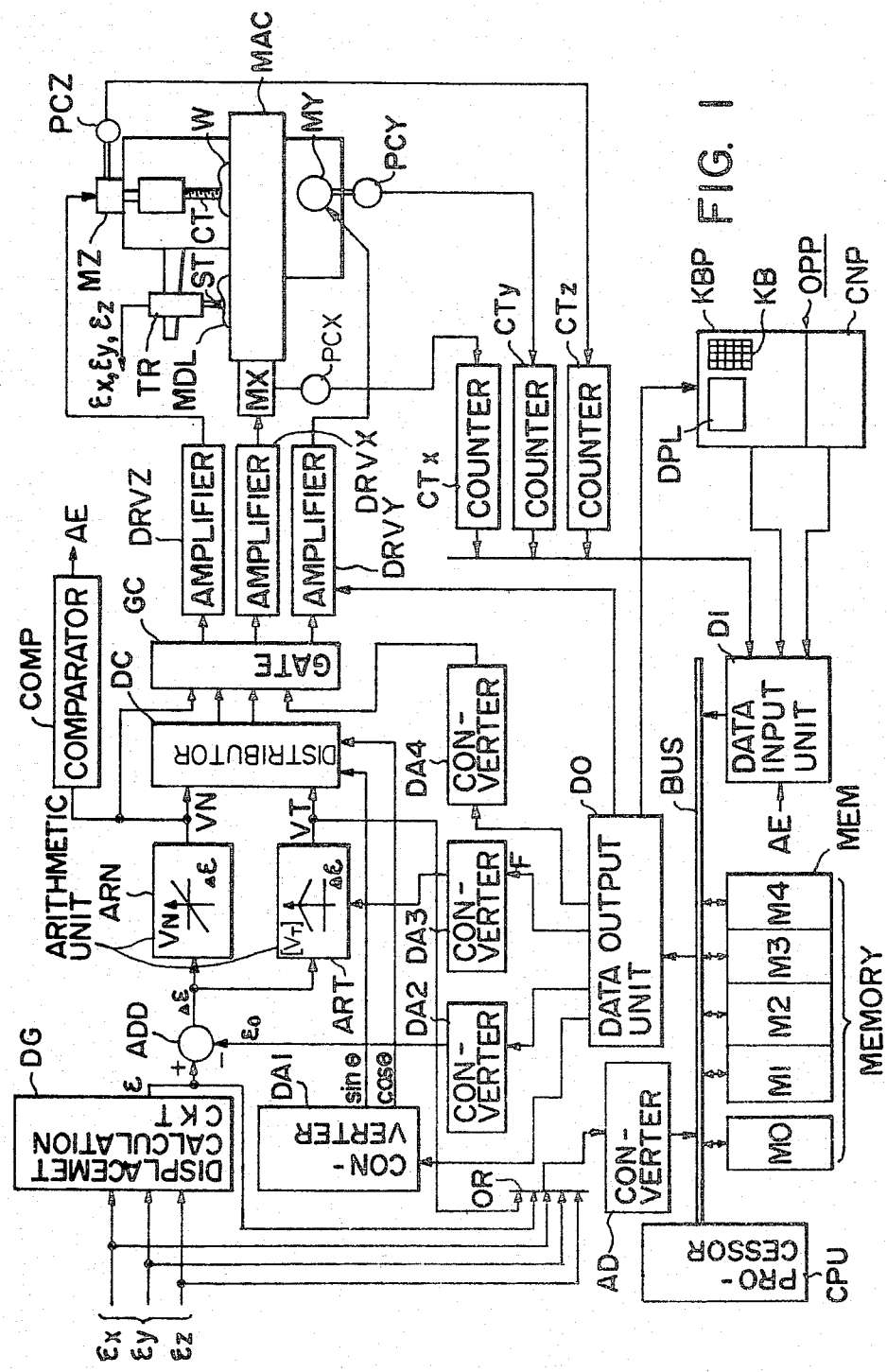
FIG. 1 is a block diagram illustrating an embodiment of the tracer control system of the present invention.

FIG. 1 illustrates in block form an embodiment of the present invention. In FIG. 1, reference character DG indicates a displacement-calculation circuit which is supplied with displacement signals $\epsilon_x$, $\epsilon_y$, and $\epsilon_z$ available from a tracer head TR; ARN and ART designate arithmetic units; ADD identifies an adder; DC denotes a distributor; COMP represents a comparator; GC shows a gate; DRVX, DRVY, and DRVZ refer to amplifiers; MX, MY, and MZ indicate servo motors; PCX, PCY, and PCZ designate position detectors; MDL identifies a model; ST denotes a stylus; CT represents a cutter; W shows a workpiece; MAC refers to a tracing machine; CTX, CTY, and CTZ indicate reversible counters for counting pulses from the position detectors to indicate the current position of the stylus; OPP designates an operator panel; KB identifies a keyboard; DPL denotes a character display; KBP represents a keyboard panel; CNP shows a control panel; DI refers to a data input unit; MEM indicates a memory composed of a memory part M0 for a control program, a work memory part M1, a memory part M2 for picture information, a memory part M3 for formats of parameters, and a memory part M4 for data of parameters; D0 identifies a data output unit; CPU denotes a processor; DA1 to DA4 represent D-A converters; and AD shows an A-D converter.

From the displacement signals $\epsilon_x$, $\epsilon_y$, and $\epsilon_z$ produced in accordance with the displacement of the stylus ST contacting the model MDL, the displacement calculation circuit DG derives a composite displacement signal, $\epsilon = \sqrt{\epsilon_x^2 + \epsilon_y^2 + \epsilon_z^2}$. The composite displacement signal $\epsilon$ is provided to the adder ADD to obtain the difference $\Delta\epsilon$ between the composite displacement signal $\epsilon$ and a reference displacement signal $\epsilon_0$. In the arithmetic circuits ARN and ART there are produced a normal-direction velocity signal $V_N$ and a tangential-direction velocity signal $V_T$ respectively. The distributor DC provides a velocity command signal in accordance with direction-of-displacement signals sin $\theta$ and cos $\theta$ applied from the D-A converter DA1 and supplies the velocity command signal to the gate GC. The velocity command signal is fed to that one of the amplifiers which is selected by the gate GC, and the servo motor corresponding to the selected amplifier is driven in response to the velocity command signal, bodily feeding the cutter CT and the tracer head TR. No detailed description will be given of these operations.

According to the present invention, various parameters necessary for the tracing operation are entered from the keyboard KB or the like of the operator panel OPP and stored in the memory MEM, and in response to the tracing operation, the data are read out from the memory MEM to control the tracing path. In a tracer control system, the parameters for the tracing operation are displayed on the character display DPL provided on the operator panel OPP, and the values of parameters entered by the operator from the keyboard KB are also displayed on the character display DPL, to allow ease in checking of the parameters necessary for the tracing operation, entering of the required parameters, and checking of the set values. As the various parameters, use can be made of parameters such as shown in the following table.

TABLE 1

| Item | Parameter | Item | Parameter |
|---|---|---|---|
| (1) | Reference displacement | (9) | Pick feed velocity |
| (2) | Trace axis | (10) | Pencil trace |
| (3) | Trace direction | (11) | 45° trace |
| (4) | Trace velocity | (12) | Z-axis pick feed |
| (5) | Pick feed direction | (13) | Cutting mode (finish/rough) |
| (6) | Pick feed axis | (14) | Auto return |
| (7) | Pick feed value | (15) | Z-axis reference displacement |
| (8) | Pick feed method | (16) | Various limits |

Figure 2:
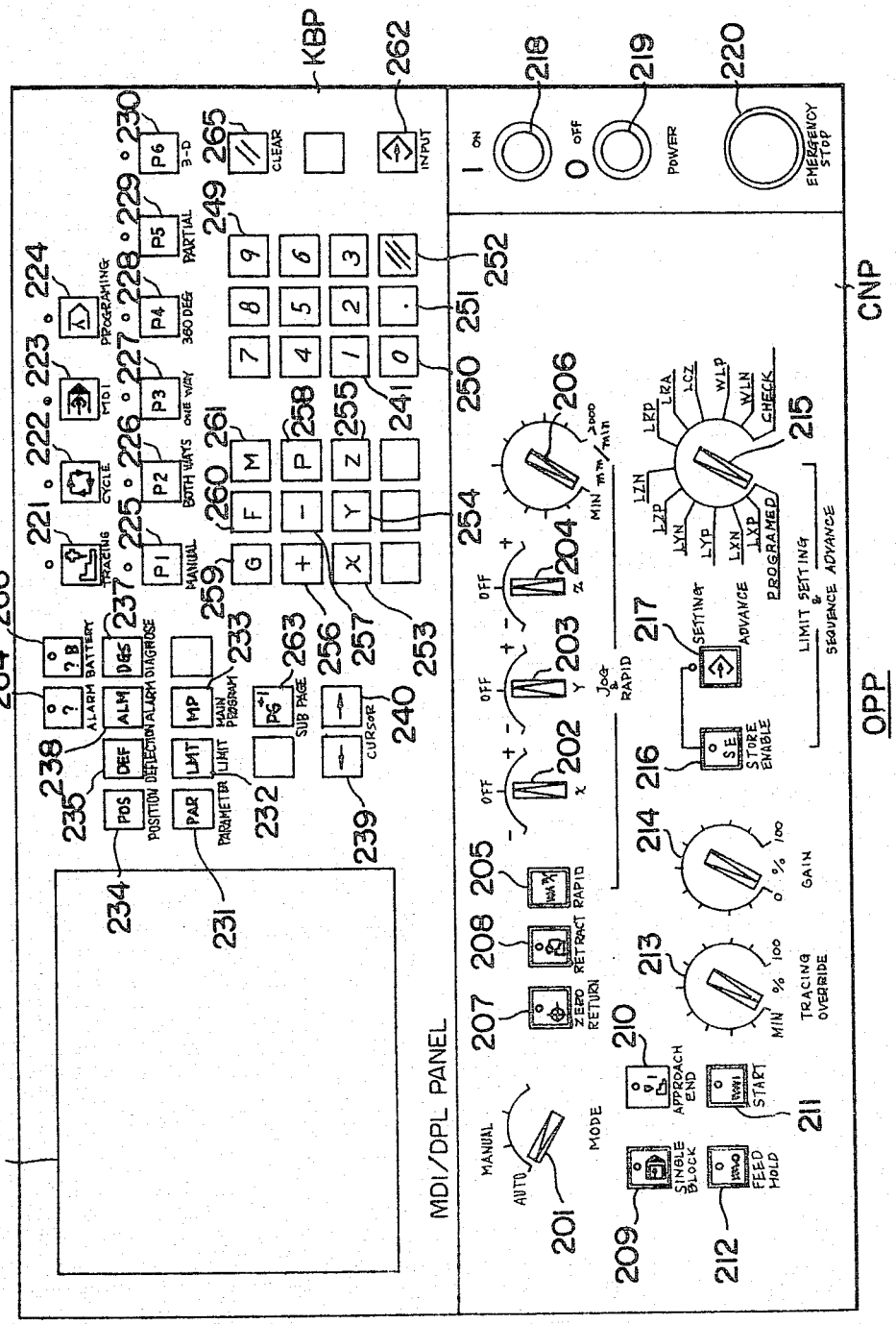
FIG. 2 is a detailed front view of an operator panel used in the embodiment of FIG. 1.

FIG. 2 shows the operator panel OPP, which comprises the keyboard panel KBP and the control panel CNP. On the keyboard panel KBP there are provided the cathode ray tube type display DPL, for displaying various parameters, various keys and pilot lamps; on the control panel CNP there are provided switches including mode setting switches, push buttons, and dials, and pilot lamps.

Input information entered from the various switches, push buttons, and dials on the operator panel OPP can be read out by the processor CPU via the data input unit DI and the bus BUS, and predetermined data can be displayed on the display of the operator panel OPP from the processor CPU via the bus BUS and the data output unit DO. A description will be given of the respective elements of the control panel CNP and the keyboard panel KBP.

Control Panel CNP (1) Mode switch 201

Setting this switch to "manual" permits jog feed, rapid feed, or handle feed. In an "auto" mode, tracing, program control, MDI, and programming are possible.

(2) Jog Switches 202–204

When the switch is turned ON in the "manual" mode, jog feed is effected in the direction of the axis designated. In the "auto" mode, an approach is effected in the direction of the designated axis. Upon contact of the stylus of the tracer head with the model, the approach is decelerated, and when the displacement of the tracer head reaches $2\epsilon_0/3$, the approach comes to an end.

(3) Rapid button 205

Depressing this button concurrently with the jog button in the "manual mode" causes rapid feed to take place.

(4) Jog velocity dial 206

The velocities of jog feed, approach operation, clamp tracing, rapid feed in one way tracing, automatic return after tracing, and Z-axis pick feed are changed by this potentiometer.

(5) Zero return button 207

Turning ON this button and then the jog switch causes rapid feed to be effected in the designated axis-direction. When the zero point of the machine is reached, the feed is stopped.

(6) Single block button 209

Turning ON this button, during program running, causes the machine to stop after execution of one block of the program. In the case of tracing operation, the machine stops after execution of one sequence.

(7) Approach end indication 210

(8) Start button 211

Tracing, program, and MDI can be started. Re-start in single block and in feed hold is possible.

(9) Feed hold button 212

Tracing, program, and MDI can be stopped temporarily. Re-start is effected by depressing the start button.

(10) Tracing override dial 213

The velocity of tracing and pick feed can be overriden.

(11) Gain setting dial 214

The sensitivity in the direction of pencil tracing and in the Z-axis, in manual tracing and in three-dimensional tracing, can be changed.

(12) Limit setting switch 215

This switch is used for setting limits. When the switch is set to LXP to LCZ, the address of the selected limit is searched in the control equipment. When the switch is set to WLP or WLN, the area of a potential limit wire is secured in a memory provided in the control equipment. With the switch set to CHECK, when a limit in the axis-direction of manual feed is reached, the manual feed is stopped and the limit set position can be checked with the actual position of the machine. If the switch is set to PROGRAMMED during tracing, then the limit being monitored is searched in the tracing state.

(13) Store enable button 216, set button 217

Depressing the set button with the store enable button in the ON state stores the position of the machine as the limit data selected by a selector. In this case, if the limit setting switch 215 is set to CHECK, a sequence of tracing also proceeds to the next sequence. During tracing, when the store enable button is OFF, the depression of an advance button causes the sequence of tracing to proceed to the next sequence. At this time, however, the limit data is not rewritten.

(14) Start button 218, stop button 219

These buttons are used for turning ON and OFF the power supply.

(15) Emergency stop button 220

Depressing this button stops the feed instantaneously, and all information is cleared.

Keyboard Panel KBP

When the mode switch 201 of the control panel CNP is set to AUTO and is selected, the following operations are possible.

(1) Tracing mode button 221

Trace running (2) Program control mode button 222

Programmed running (3) MDI mode button 223

One block of data can be entered. The block is executed by depression of the start button.

(4) Programming mode button 224

This button is depressed for programming the programmed running.

Switching the abovesaid mode to TRACING, causes one of the tracing modes mentioned below in items (5) to (10):

(5) Manual trace mode button 225

Turning ON this button allows manual trace.

(6) Both ways scan trace mode button 226

Turning ON this button allows both ways scan trace.

(7) One way scan trace mode button 227

Turning ON this button allows one way scan trace.

(8) 360° contour trace mode button 228

Turning ON this button allows 360° contour trace.

(9) Partial contour trace mode button 229

Turning ON this button allows partial contour trace.

(10) Three-dimensional trace mode button 230

Turning ON this button allows three-dimensional trace.

In the case where the program control button is ON and the trace mode is selected within the program, a lamp is lighted to indicate the tracing mode during the execution of that program.

CRT Scanning (1) Parameter button 231

Depressing this button displays the parameter to be set for the selected tracing mode on the CRT.

(2) Limit button 232

Depressing this button displays the limit to be set for the selected tracing mode on the CRT.

(3) Main program button 233

Depressing this button displays the first page of a main program on the CRT.

(4) Position button 234

Depressing this button displays the current position of the tracer head, in characters three times larger than the other information on the CRT.

(5) Deflection button 235

Depressing this button displays the displacement of the tracer head, in characters three times larger than the other information on the CRT.

(6) Alarm button 236

This is depressed for displaying the contents of various alarms on CRT.

(7) Diagnose button 237

This is depressed for displaying signals from and to the machine and various system parameters on CRT.

(8) Cursor buttons 239 and 240

Depressing these buttons moves a cursor ("-" in the lowest line of the CRT) laterally.

(9) Ten-keys 241 to 252, address keys 253 to 261

A character can be displayed by bringing the cursor to a required position and writing by the address keys or ten-keys.

(10) Input button 262

Depressing this button, data written in the lowest line of CRT is inputted to the corresponding position and rewritten. In the case of an alternative (e.g. X/Y), the cursor is brought to the position of the initial character of the word desired to be selected, and then the input button is depressed, by which the selected word is replaced as data at the corresponding position.

(11) Sub-page button 263

A program or the like cannot be displayed in one picture and extends over several pictures. Depressing this button changes the displayed page of the program.

(12) Alarm display 264

Occurrence of various alarms is indicated by lighting a lamp.

(13) Clear button 265

The cause of an alarm is removed by this button to restore control. Depressing this button during running clears the control equipment entirely, to be returned to its initial state.

(14) Battery display 266

This is lighted when the voltage of a battery backing up the memory goes below a certain value.

Figure 3:
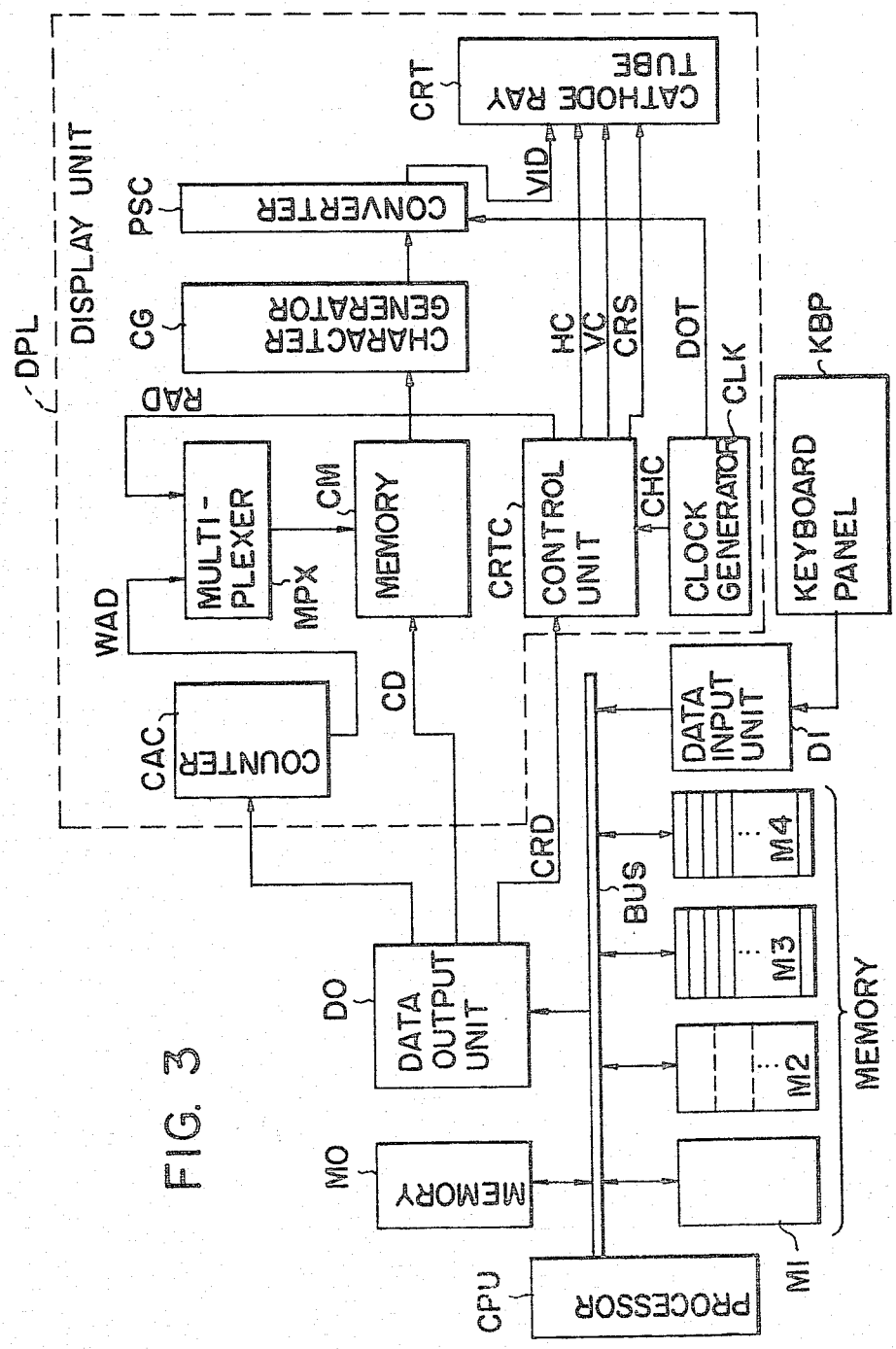
FIG. 3 is a block diagram showing the character display utilized in FIG. 1.

FIG. 3 is a block diagram illustrating in detail the character display DPL. Blocks utilized in FIG. 1 are identified by the same characters.

Reference character CRT indicates a cathode ray tube type display; CM designates a character memory for storing character information for one picture; CAC identifies a character address counter; CLK denotes a clock generator; CRTC represents a CRT control unit; MPX shows a multiplexer; CG refers to a character generator; PSC indicates a parallel-serial converter; CD designates character information; CRD identifies cursor position information; CHC denotes a character clock; DOT represents a dot clock; WAD shows write address information; RAD refers to read address information; HC indicates a horizontal deflection signal; VC designates a vertical deflection signal; CRS identifies a cursor display signal; and VID denotes a video signal.

When one tracing mode is selected on the operator panel OPP, this selection is read out by the processor CPU via the data input unit DI and the bus BUS, and under the control of a control program stored in the memory M0, the corresponding picture information stored in the picture information memory M2 is read out for input to the character memory CM via the data output unit DO. The picture information is written in the character memory CM by providing the write address information WAD to the address counter CAC via the data output unit DO, and the character information CD is successively read out from the memory M2 to the character memory CM.

The read address information RAD from the control unit CRTC is supplied via the multiplexer MPX to the character memory CM. By accessing the character memory CM cyclically from its leading to last address, the character information is successively read out therefrom and applied to the character generator CG. The character generator CG converts the character information to dot information, which is provided to the parallel-serial converter PSC, wherein it is converted to a serial signal synchronized with a dot clock to provide the video signal VID for display on the CRT display. The video signal VID is displayed on the CRT display CRT under the control of the horizontal and vertical deflection signals HC and VC, with the result that the character information of one picture stored in the character memory CM is displayed on the CRT display.

The picture information memory M2 has stored therein various parameters (described in detail later) necessary for the selected tracing operation, and the operator enters the values of the required parameters one after another from the keyboard KB while observing the parameters displayed on the CRT display CRT. In this case, when the operator enters the codes indicating the required parameters, the processor CPU reads out from the parameter format memory M3 the parameter format information corresponding to each of the specified parameters and successively writes the respective information in specified areas of the character memory CM for display in a parameter format display area (for example, in the last line of the picture) of the CRT display CRT.

After checking the parameter format displayed on the CRT display, the operator enters data for the parameter, that is, enters numeric data or specifies address information. The parameter value thus entered is stored temporarily in the work memory M1 and, at the same time, written in the character memory CM so that it is displayed on the CRT display CRT. When the operator depresses the input button after making sure on the CRT display that the parameter value entered is correct, the parameter value is stored in the data memory M4. At the same time, the parameter value stored in the parameter format display area of the character memory CM is erased, and the data of the newly adopted parameter is written in the address position corresponding to a parameter data display area, by which the parameter data display position on the CRT display is shifted.

The format information stored in the parameter format memory M3 is capable of including alternative information such as, for example, X/Y/Z or ON/OFF, rather than information requiring entry of a numeric value as mentioned above. In this case, depressing the cursor button on the operator panel causes the processor CPU to modify the cursor data CRD to change the timing of the cursor signal CRS, thereby successively shifting the cursor display position on the CRT display in the row direction. Accordingly, by depressing the input button after bringing the cursor to the position where the data of the parameter to be selected is displayed, the data of the parameter can be entered.

Of the parameter format information read out from the memory M3 and stored in the work memory M1, the data designated by the cursor is written in a parameter display area of the character memory CM in response to the operation of the input button, the data display position is shifted in the same manner as described above, and the data is stored as parameter setting data in the memory M4.

Now, a description will be given of the tracing operation modes (six modes in this embodiment of the invention), and of the picture information which is displayed on the CRT display corresponding to each mode.

(1) Manual trace mode

By depressing the buttons 221 and 225 to select the tracing mode and the manual trace mode and then depressing the parameter button 231 on the keyboard KBP in FIG. 2, the picture information shown in FIG. 4 is displayed on the CRT display CRT.

In FIG. 4, the characters underlined are stored in the picture information memory M2, and indicate the picture information read and displayed in response to the depression of the abovesaid buttons. That is, the name of the mode (MANUAL TRACE) is displayed in a first line; the line number (01), the reference displacement $\epsilon_0$ (DEFLECTION) indicating the kind of data, a colon (:) and the unit (millimeter=MM) are displayed in a second line; and the last line is assigned for a display of the input of data of a parameter.

In the case where it is desired to set, for example, 0.200 MM as the reference displacement $\epsilon_0$, if the line number 01 is entered by the numeric keys, then the parameter format data corresponding to the reference displacement is read out from the parameter format memory M3 in response to the line number 01, and this data is displayed in the last line of the CRT display as follows:

01=0.200

Then, entering 0.200 by the numeric keys, stores it in the work memory M1, and, at the same time, the numerals are displayed one after another at the position next to the above display in the last line of the CRT display. Next, depressing the input button 262 stores this value as the data of the reference displacement $\epsilon_0$ at the corresponding address position in the data memory M4, the content of the character memory is rewritten and erased, and the display of the numerical value 0.200 is shifted to the first line, erasing the display in the last line.

(2) Both ways scan trace mode

Depressing the buttons 221 and 226 to designate the both ways scan trace and then depressing the parameter button 231 displays the parameters necessary for this tracing mode, as shown in FIG. 5. In FIG. 5, parameters such as trace direction, trace velocity, pick feed value, pick feed method, pick feed velocity, pencil tracing, 45° trace, cutting mode, auto return, and diagonal copy (i.e. tracing in an arbitrary direction) are displayed in the third and following lines, with line numbers 02 et seq.

These items of picture information are stored in the picture information memory M2 corresponding to this mode, and they are displayed on the CRT display in response to the designation of the abovesaid mode. With respect to the parameters at line numbers 02, 05, 07, 08, 09, 10, and 11, by entering the line numbers by the numeric keys the parameter format information of Table 2 stored in the parameter format memory M3 can be read out sequentially, and displayed in the last line.

TABLE 2

| Line number | |
|---|---|
| 02 | +X/−X/+Y/−Y |
| 05 | AXIS/TANGENTIAL/TIMER |
| 07 | OFF/ON |
| 08 | OFF/ON |
| 09 | FINE/ROUGH |
| 10 | OFF/ON |
| 11 | OFF/ON |

In the case of setting, for example, the direction +X as the trace direction, when the line number 02 is entered, the parameter format information shown in FIG. 6 is read out from the memory M3 and is temporarily stored in the memory M1. This information is written in the character memory CM and displayed in the last line of the CRT display. On the other hand, the processor CPU imparts the cursor position information CRD to the control unit CRTC to command it so that the cursor display CRSP may be provided at the position of an nth character (the position of the sign + of +X in the illustrated example) of first data. In the case where the operator sets the trace direction +X, the input button 262 is depressed in the abovesaid state, causing the data to be stored as trace direction data in the memory M4, and, at the same time, to be written at the corresponding address position of the character memory for displaying +X in the third line of the CRT display.

In the case where it is desired to set some other direction, the processor CPU provides, upon each depression of the cursor botton 240, cursor position information CRD to the control unit CRTC, so that the cursor position CRSP shifts in the order −X→+Y→−Y; therefore, it is sufficient to depress the input button 262 after setting the cursor position to the data desired to select.

(3) One way scan trace mode

Depressing the buttons 221 and 227 to select the one way scan trace mode and then depressing the parameter button 231 produces a parameter display as shown in FIG. 7.

In the lines 11 and 12, parameters such as upward tracing and slow approach are displayed respectively. The parameter format information therefor is as shown in the following table.

TABLE 3

| Line number | Parameter format information displayed |
|---|---|
| 11 | OFF/ON |
| 12 | Z/XY |

(4) 360° contour trace mode

Depressing the buttons 221 and 228 and then the parameter button 231 produces a display as shown in FIG. 8. Line number 02 represents the trace direction and line number 07 represents the Z axis pick feed, and the parameter format information therefor are as shown in Table 2.

TABLE 4

| Line number | Parameter format information displayed |
|---|---|
| 02 | LEFT/RIGHT |
| 07 | OFF/ON |

(5) Partial contour trace mode

Depressing the parameter button 231 displays the parameters shown in FIG. 9.

(6) Three-dimensional trace mode

Depressing the buttons 221 and 230 and the parameter button 231 displays the parameters shown in FIG. 10.

Next, a description will be made of setting and display of various limits.

(1) Manual trace mode

Depressing the buttons 221 and 225 and the limit button 232 causes a picture as shown in FIG. 11 to be read out from the memory M2 and displayed on the CRT display.

Positive and negative trace stroke limits LXP and LXN in the X-axis direction are spaced apart horizontally on the CRT display, and positive and negative trace stroke limits LYP and LYN in the Y-axis direction are spaced apart vertically, with the co-ordinate axis 111 displayed. The trace stroke limits in the X- and Y-axes are displayed two-dimensionally in the form of an area diagram.

LRP and LCZ indicate an auto return end limit and a clamp limit respectively, and the format information representing the respective limits is displayed with limit numbers 01 to 04, 07, and 09 associated therewith.

Designating the limit number by the numeric keys displays the designated limit number, and the parameter format information corresponding thereto, in the last line in accordance with the following Table 5.

TABLE 5

| Limit number | Parameter format information displayed |
|---|---|
| 01 | |
| 02 | |
| 03 | = /OFF |
| 04 | |
| 07 | |
| 09 | |

The blank between the equality sign and the slash instructs the operator to enter numeric data; when entered by the operator using the numeric keys, the numeric information is once stored in the memory M1 and, at the same time, provided to the character memory CM and displayed in the last line of the CRT display. When the operator depresses the input button 262, this numeric data is stored as limit data of the designated limit number in the data memory M4, and written in the character memory CM so that it may be displayed near the limit display and the limit number display position (in the next line in the illustrated example) on the CRT display.

The display OFF is to erase previously entered limit data from the display screen and invalidate stored data. When entering the limit number, if the limit data is already entered, it is displayed; but, by depressing the input button 262, with the cursor set to the initial character of "OFF", the limit data corresponding to the limit number is erased from the data memory M4 and the character memory CM, resulting in the display on the CRT display being erased.

(2) Both ways scan trace mode

Depressing the buttons 221 and 226 and the limit button 232, various limits shown in FIG. 12 are displayed. In FIG. 12 there are shown a limit wire WL and positive and negative Z-axis tracing stroke limits LPZ and LNZ in addition to the limit shown in FIG. 11.

The limit wire provides a line imparting a potential on the model and, by a signal produced when the stylus of the tracer head runs across this line, the sequence is switched. The parameter format data is as follows:
OFF/ON Depressing the page button 263 of the operator panel OPP displays the next page, as shown in FIG. 13.

FIG. 13 shows the co-ordinate value of the point where pick feed is effected. X indicates the X-axis co-ordinate value and WLPY the Y-axis co-ordinate value. In this example, the Y-axis limit means the start of pick feed.

(3) One way scan trace mode

Depressing buttons 221 and 227 and the limit button 232 produces a limit display as shown in FIG. 14. In this display, a slow approach limit LRA is added.

(4) 360° contour trace mode

Depressing buttons 221 and 228 and the limit button 232 produces a limit display as depicted in FIG. 15.

In FIG. 15, LXP and LYP respectively indicate a pick feed limit, and LZP and LZU respectively indicate a Z-axis limit for trace ending use.

(5) Partial contour trace mode

Depressing buttons 221 and 229 and the limit button 232 produces a limit display as depicted in FIG. 16. In this example, LXP, LXN, LYP, and LYN respectively indicate trace turning limits.

(6) Three-dimensional trace mode

Depression buttons 221 and 230 and the limit button 232 produces a limit display as shown in FIG. 17. In this example, LXP and LYP indicate trace end limits.

Input and Display of Main Program Information

Depressing the button 224 induces the programming mode; depressing the main program button 233, displays a picture as shown in FIG. 18 on the CRT display; and depressing the sub-page button displays a picture as depicted in FIG. 19 on the CRT display. In other words, the picture information of a main program is read out from the memory M1 and displayed on the CRT display.

In FIGS. 18 and 19, G00 indicates positioning by rapid feed, G01 positioning by cutting velocity, G10 repetitive trace control, a numerical value 99 an incremental value specify code, and F the feedrate. The other displays are the same as those already explained.

Also in this example, only the underlined characters are displayed initially, and, as in the case of the parameters described previously, the format information for program data is called up by specifying the line number in the last line of the CRT display, and the desired program can be entered, stored, and displayed in the same manner as described previously.

Display of Machine Position Information

Figure 20:
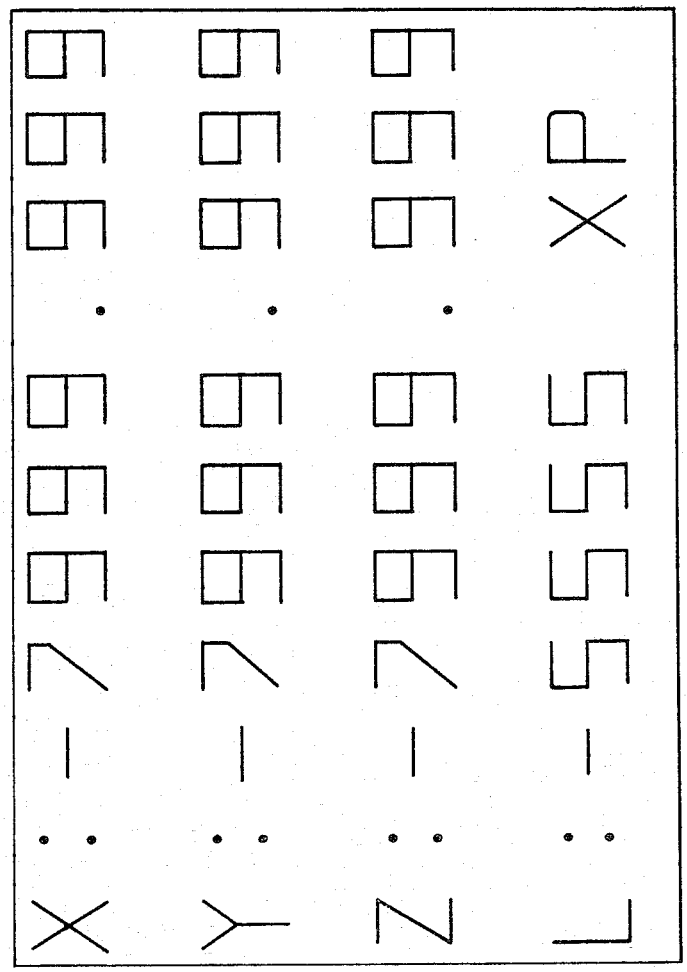

By depressing the position button 234, the current position of each axis and the setting position of the limit now monitored by the tracer control equipment can be displayed as shown in FIG. 20.

That is, the abovesaid current position is displayed by reading out the contents of current position counters CTX, CTY, and CTZ via the data input unit DI, and writing them in the character memory CM via the data output unit DO. The limit being monitored is displayed by writing in the character memory CM via data output unit DO the limit data read out by the processor CPU from the data memory M4 and stored in the work memory M1 for comparison with the current position information.

Display of Tracer Head Displacement Information

Figures 21, 22:
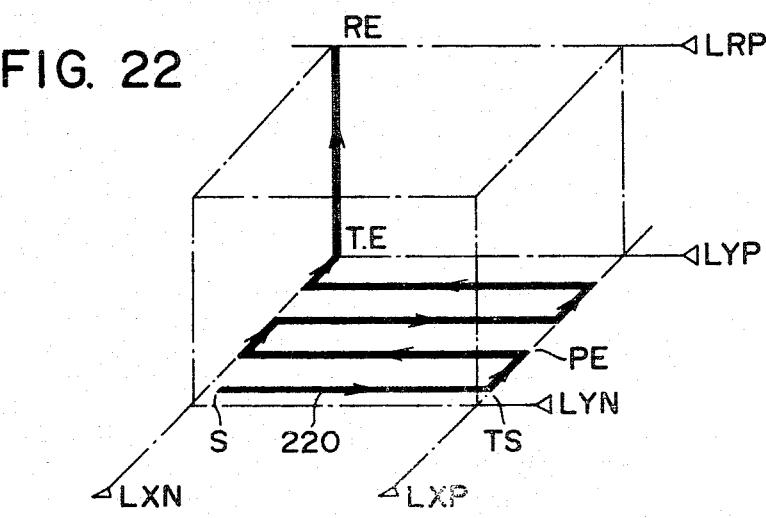

Depressing the deflection button 235 displays on the CRT a displacement value E ($\epsilon$ in FIG. 1), an error signal ED ($\epsilon - \epsilon_0$ in FIG. 1), a Z-axis displacement value EZ ($\epsilon_z$ in FIG. 1), and a gravity-axis displacement value EG ($\epsilon_z$ in FIG. 1) of the tracer head, as shown in FIG. 21. That is, the displacement value $\epsilon$ and the Z- or gravity-axis displacement value $\epsilon_z$ of the tracer head are read out by the processor CPU via an OR gate OR and the A-D converter AD, and the error signal $\epsilon - \epsilon_0$ is obtained by calculation from the reference displacement value $\epsilon_0$ preset in the data memory M4 and the read displacement value $\epsilon$. These data are written in the character memory of FIG. 2 via the data output unit DO, and displayed as shown in FIG. 21.

Another Method of Entering Various Limit Information

Various limit information may also be entered in the following manner: By moving the machine in the manual mode, and depressing the set button at a suitable instantaneous positional relationship between the tracer head and the model, the current position at that time is stored as the limit information.

That is, for example, by setting the mode switch 201 to "MANUAL", depressing the store enable button 216, setting the limit setting dial 215 to LXP, and turning down the X-axis jog switch 202 to the right in FIG. 2, the processor CPU provides via the data output unit DO to the D-A converter DA5 velocity information dependent on the velocity designated by the feedrate dial 206, and causes the gate GC to select the axis designated by the jog switch 202, performing +X-axis feed. With the movement of the machine in the +X-axis direction, the content of the counter CTX is updated, and at the instant when the set button 217 was depressed, the content of the counter CTX is read out by the processor CPU and stored as X-axis stroke limit data in the memory M4. All limit information can be entered by presetting the limit setting switch 215 to a desired item and effecting the same manual operation described above.

Next, the tracing operation will be described with reference to the case of both ways scan trace shown in FIG. 22. Assume that the various parameters described previously in connection with FIG. 5 are all set and stored in the memory M4.

In FIG. 22, reference numeral 220 indicates a tracing path of the tracer head. Let it be assumed that the tracer head is positioned by the approach operation at the start point S prior to the start of automatic tracing.

Upon depression of the start button 211, the automatic tracing operation is started. That is, the processor CPU reads out the preset reference displacement $\epsilon_0$ from the memory M4 and provides it via the D-A converter DA2 to the adder ADD, from which the error signal $\Delta \epsilon = \epsilon - \epsilon_0$ is applied to the arithmetic units ARN and ART. The respective axial displacement components $\epsilon_x$, $\epsilon_y$, and $\epsilon_z$ of the tracer head are read out by the processor CPU, via the A-D converter AD, to calculate the direction-of-displacement signals sin $\theta$ and cos $\theta$, which are provided via the D-A converter DA1 to the dispatcher DC, wherein the feedrate of each axis motor is determined. The feedrate data is read out from the memory M4 and applied via the data output unit DO and the D-A converter DA3 to the arithmetic circuit ART to determine its output level, producing a tangential velocity $V_T$ in accordance with the feedrate data. The trace direction has been designated to be +X and, based on this trace direction, the processor CPU changes over the gate GC to achieve tracing in the direction +X.

The processor CPU reads out the content of the X-axis counter CTX with a suitable period and, compares it with the value of the set X-axis positive limit (a tracing stroke limit) LXP, and, in the case of coincidence, proceeds to the Y-axis pick feed. Namely, until pick feed of the set value has been effected, a predetermined numerical value corresponding to the set velocity is written in the D-A converter DA4 and the gate GC is switched, so as to perform pick feed along the set axis (Y-axis). When the content of the Y-axis counter CTY varies by the set pick feed value during pick feed, the processor CPU shifts to backward trace in the −X axis direction.

In the backward trace, the processor CPU monitors the data of the limit LXN read out from the data memory M4 and the current position information in the X-axis read from the counter CTX, and when they match with each other, operation is shifted to the Y-axis pick feed again. Similarly, upon completion of the Y-axis pick feed, the forward trace in the direction +X is resumed. In this way, both ways scan trace is carried out repeatedly, and, when the content of the counter CTY matches with the value of the set limit LYP (at point TE), the processor CPU stops the trace operation, switches the drive axis, to the Z-axis and stops the tracer head from movement when the Z-axis current position matches with the limit LRP.

As has been described in the foregoing, according to the present invention, since parameters necessary for the tracing operation can be displayed on a character display, it is possible to easily check the parameters and ensure their setting; furthermore, since data of entered parameters can easily be checked, the data can be set without fail.

It will be apparent that many modifications and variations may be effected without departing from the scope of the novel concepts of this invention.

What is claimed is:

1. A tracer control system which is selectively operable in a plurality of trace modes for tracing a model, said system comprising:
   means for calculating trace direction and trace velocity from displacement signals of a tracer head tracing the model surface during a selected tracing operation corresponding to a selected one of said trace modes;
   trace mode selecting means for selecting one of said plurality of trace modes;
   display means for displaying a respective set of parameters for defining said selected tracing operation for the selected trace mode; and
   means for selectively setting the value of each said parameter during the display thereof.

2. The tracer control system of claim 1, wherein said display means displays a plurality of trace limits of the selected tracing operation simultaneously in a geometric arrangement corresponding to the respective geometric limits of these ones of the parameters defining the selected tracing operation.

3. The tracer control system of claim 1, wherein said display means displays an identify code corresponding to each said parameter being displayed, and said tracer control system including means for adopting selected data as the parameter corresponding to each of said identify codes being displayed by selectively entering said identify codes from said keyboard, said identify codes being displayed in an input data display area of said display means.

4. The tracer control system of claim 1, wherein, during each sequence of said selected tracing operation, said display means displays a limit position defining the end position of said sequence as a parameter.

5. The tracer control system of claim 1, wherein said display means selectively displays at least one or more of a displacement value $\epsilon$, an error signal $\epsilon - \epsilon_0$, a Z-axis displacement value, and a gravity axis displacement value of said tracer head.

6. A tracer control display system, for controlling a tracer and displaying selected information, comprising:

converter means for receiving displacement information from the tracer;

counter means for receiving positional information of the tracer;

display means for displaying selected information corresponding to the parameters of a selected trace mode;

keyboard means for receiving selected numerical data which may be entered thereon;

trace mode selection means for specifying the selected mode from a plurality of trace modes in which the tracer is to operate;

format memory means for storing a respective format for displaying the parameters corresponding to each said mode, said format memory means being operatively connected to said mode selection means and to said display means, and said display means being adapted to selectively display each said respective format;

data memory means for receiving data from said keyboard means and for storing said data;

processor means for storing a program and for selectively generating commands in accordance with a selected program corresponding to said selected trace mode, said processor means being operatively connected to said display means, to said converter means, to said counter means, to said keyboard means, and to said data memory means, for receiving information which may be provided by said keyboard means, by said converter means, by said counter means, or by said data memory means, and said processor means also being adapted to receive programs from said keyboard means; and data output means, operatively connected to said processor means and to said trace mode selection means, for transmitting the commands from said processor means corresponding to said selected program, to the data stored in said data memory means, to the information from said converter and counter means, as a control signal to said tracer.

7. The system of claim 6, further comprising:

manual control means for manually specifying a selected direction of motion of the tracer head, said data output means being operatively connected to said manual control means for transmitting control signals therefrom to said tracer head.

8. The system of claim 7, further comprising set button means, operatively connected to said converter and counter means and to said data memory means, for transmitting positional information from said counter means to said data memory means selectively on command.

9. The device of claim 6, further comprising input button means, operatively connected to said keyboard means, to said display means, to said processor means, and to said data memory means, for selectively transmitting information or program steps displayed on said display means to said data memory means or to said processor means respectively on command, said keyboard means being operatively connected to said display means so that data or program steps entered at said keyboard means are immediately displayed on said display means.

10. The system of claim 6, wherein the information displayed by said display means comprises alphanumeric characters.

11. The system of claim 6, 7, 8, 9, or 10, wherein said display means is adapted to display a cursor element, and further comprises cursor control means operatively connected to said processor means and said keyboard means, for selectively governing the position of said cursor as displayed by said display means, said data memory means being adapted to selectively receive data at the position of said cursor element and to store said data.

12. The system of claim 1, 2 or 3, comprising a format memory for displaying said sets of parameters in respective predetermined formats.

13. The system of claim 6, 7, 8, 9 or 10 said processor means further being operatively connected to said display means and adapted to transmit selected elements of said programs to said display means for display.

14. The tracer control system of claim 1, 2 or 3, said display means comprising:

a character memory for storing information for said display of said parameters in said predetermined formats;

a character address counter for accessing the address of said character address counter for storing said information;

a control unit for controlling the displaying of each said set of parameters and including controlling the accessing of said character memory for accessing the stored information;

a character generator for generating characters in correspondence to said accessing of said character memory by said control unit; and a display unit having an input from said control unit and an input corresponding to the stored information that is output from said character generator for said displaying of said parameters in said predetermined formats.

15. The tracer control display system of claim 6 or 9, said display means comprising:

a character memory for storing information for said display of said parameters of the selected trace mode in the respective predetermined format, a character address counter for accessing the addresses of said character address counter for storing said information, a control unit for controlling the displaying of each said set of parameters and including controlling the accessing of said character memory for accessing the stored information;

a character generator for generating characters in correspondence to said accessing of said character memory by said control unit; and a display unit having an input from said control unit and an input corresponding to the stored information that is output from said character generator for said displaying of said parameters in said respective formats.

16. The system of claim 1, 2 or 3, comprising cursor means for selecting the parameter for which the value is to be selectively set.

* * * * *

UNITED STATES PATENT AND TRADEMARK OFFICE
CERTIFICATE OF CORRECTION

PATENT NO. : 4,356,552                                    Page 1 of 2

DATED : October 26, 1982

INVENTOR(S) : IMAZEKI et al

It is certified that error appears in the above-identified patent and that said Letters Patent is hereby corrected as shown below:

Col. 1, line 24, delete "as".

Col. 3, line 1, after "," insert --and--;
       line 3, delete "and"; (first occurrence).
       line 3, delete ","  (third occurrence).

Col. 4, line 37, delete ",";
       line 60, "parameter" should be --parameters.

Col. 5, line 10, after "on" insert --the--;
       line 13, after "on" insert --the--;
       line 23, after "of" insert --the--.

Col. 9, line 46, delete "once".

Col. 10, line 37, "Depression" should be --Depressing--;
       line 45, after "button" insert --263--.

UNITED STATES PATENT AND TRADEMARK OFFICE
CERTIFICATE OF CORRECTION

PATENT NO. : 4,356,552

DATED : October 26, 1982

INVENTOR(S) : IMAZEKI et al

It is certified that error appears in the above-identified patent and that said Letters Patent is hereby corrected as shown below:

Col. 12, line 40, after "Z-axis" insert --,--.

Col. 12, line 40, the "," after "axis", (first occurrence) should be deleted.

Col. 15, lines 1-15 should be single spaced.

Signed and Sealed this

Fourteenth Day of June 1983

[SEAL]

Attest:

DONALD J. QUIGG

Attesting Officer

Acting Commissioner of Patents and Trademarks